Figure 1A:
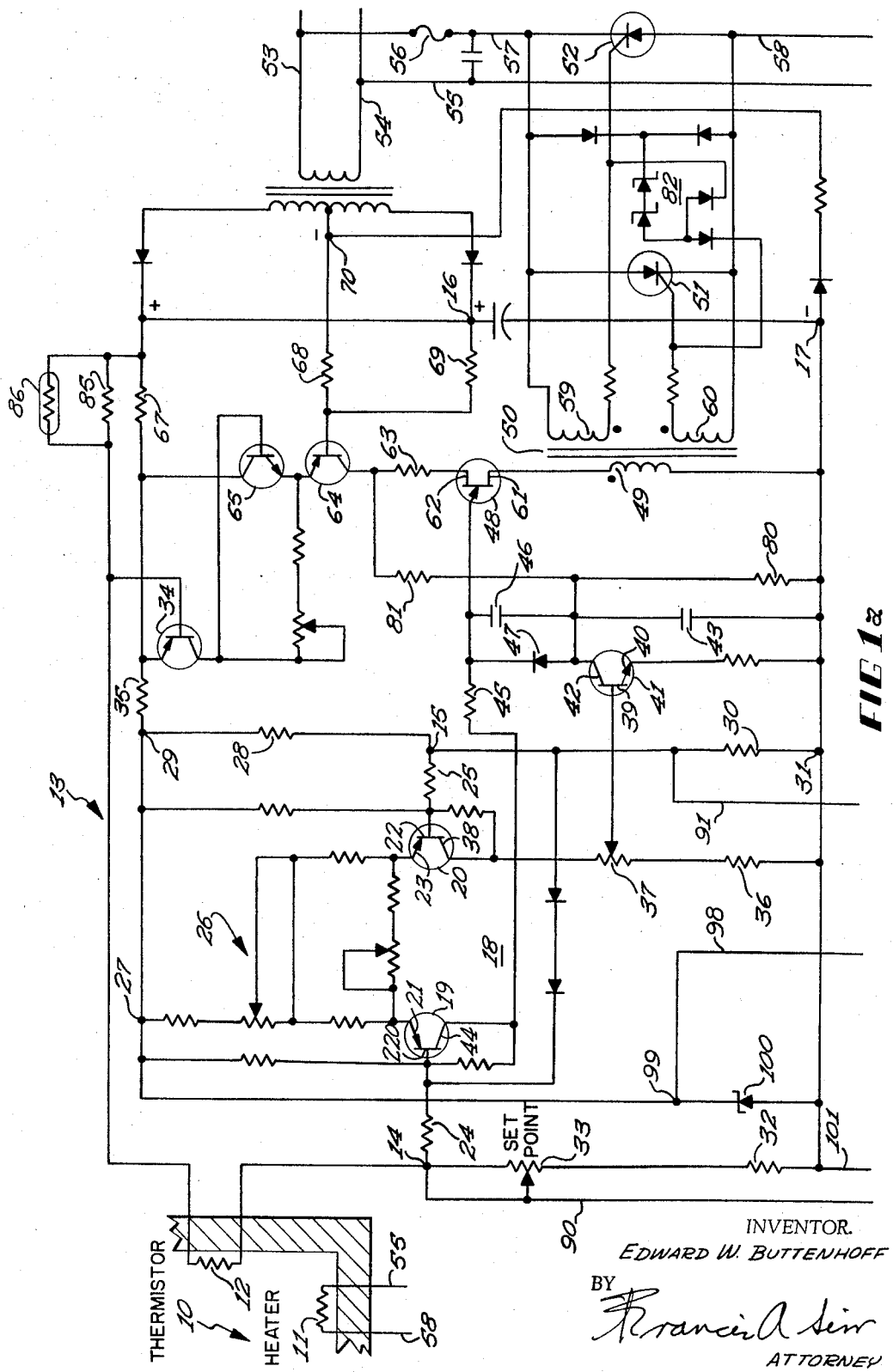

INVENTOR.
EDWARD W. BUTTENHOFF
BY
Francis A. Sim
ATTORNEY

United States Patent Office 3,305,734
Patented Feb. 21, 1967

3,305,734
CONDITION RESPONSIVE APPARATUS INCLUDING A BRIDGE WITH OUTPUT TERMINALS CONNECTED TO TWO DIFFERENTIAL AMPLIFIERS
Edward W. Buttenhoff, Excelsior, Minn., assignor to Honeywell Inc., a corporation of Delaware
Filed Sept. 20, 1963, Ser. No. 310,214
14 Claims. (Cl. 307—88.5)

This invention is concerned with an improved condition responsive apparatus and particularly with such an apparatus utilizing a temperature responsive impedance element in the form of a thermistor whose impedance changes with temperature.

Specifically, a bridge circuit is provided having a thermistor as one element of the bridge circuit. The output terminals of the bridge circuit are connected to control a first and a second differential amplifier. By definition, a differential amplifier is an amplifier having first and second outputs which vary inversely with changes in the condition of bridge unbalance. The differential amplifiers are constructed and arranged such that an increase in bridge unbalance causes an increase in magnitude of one of the amplifier outputs and a corresponding decrease in magnitude of the other of the amplifier outputs.

The two differential amplifiers are used, one to control a condition changing means and the other to provide an indication of a given departure of the condition from a given value.

The one of the differential amplifiers used to control the condition changing means is connected to control, through a unique construction, the time of firing of a unijunction transistor, the unijunction transistor being powered from a periodically interrupted source of D.C. voltage. The periodic interruption of the source of D.C. voltage is synchronized to an A.C. source of voltage which itself is connected to energize the condition changing means through a silicon controlled rectifier circuit. The silicon controlled rectifier circuit is in turn controlled by the unijunction transistor and thus the firing time of the unijunction, with respect to the A.C. source of voltage, determines the degree of energization of the condition changing means. The first and second outputs of this one differential amplifier are utilized to provide a unique circuit construction whereby the control of the firing angle of the unijunction transistor is modified in accordance with bridge unbalance to provide linear power into the heater as the bridge unbalance approaches a high degree of unbalance, indicating a need for a higher degree of energization of the condition changing means.

Furthermore, the unique construction of my invention utilizes the second differential amplifier, which is constructed and arranged to provide an indication in the form of a warning light, to indicate that the condition of balance of the bridge has deviated a given extent from that which is desired. This second differential amplifier utilizes a pair of controllable current conducting devices, for example transistors, which include individual output load resistors. This portion of my invention utilizes an indication means, considered as electrically responsive, which is interconnected to the output load resistors of the second differential amplifier by means of a unidirectional diode circuit which connects a high voltage point of each of the load resistors to a low voltage point of the other load resistor to provide indication of a given degree of unbalance of the bridge, either above or below a condition of balance.

Figure 1B:
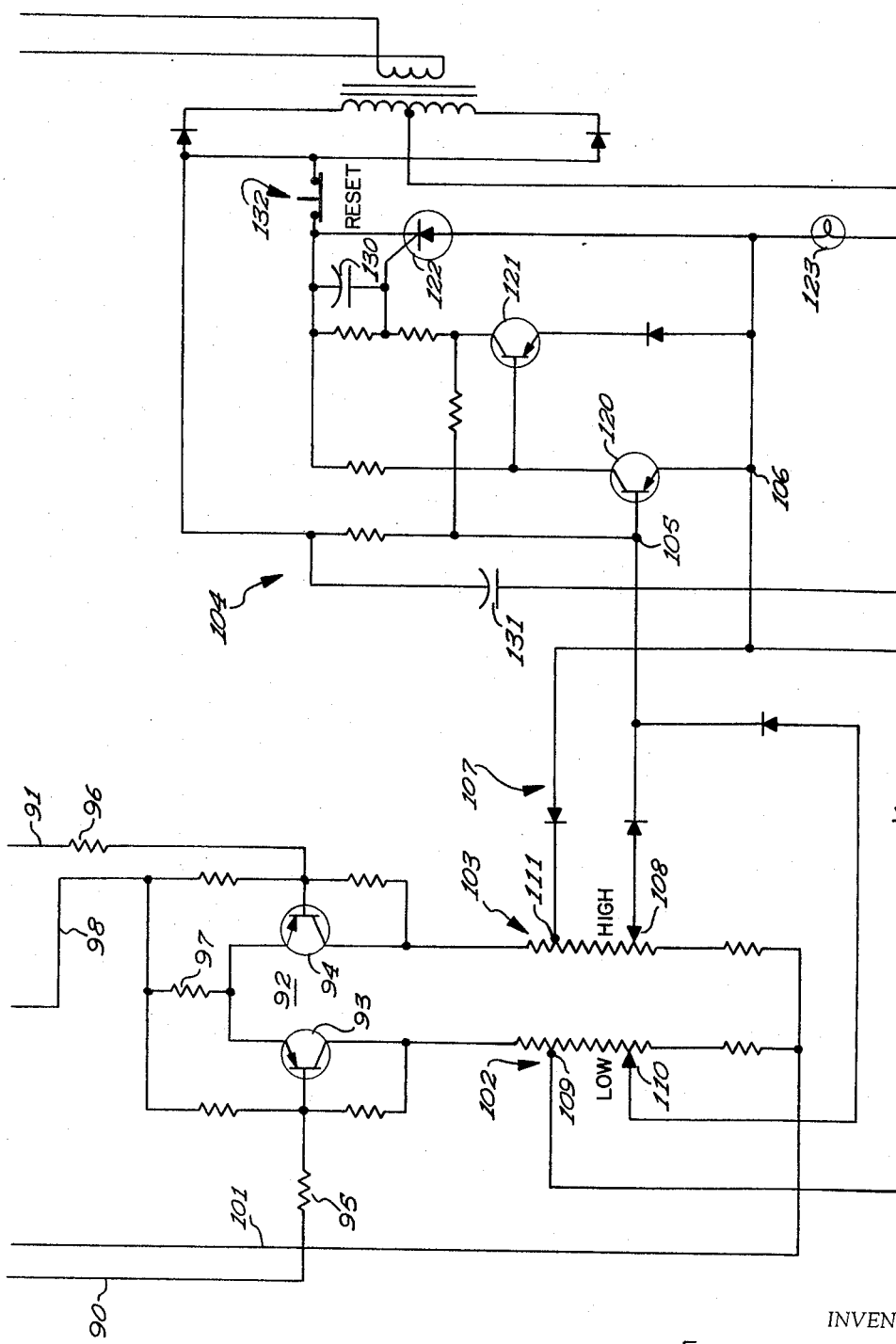

With these general considerations in mind, my invention will be apparent to those skilled in the art upon reference to the following specification, claims, and drawing, of which FIGURES 1A and 1B disclose a preferred embodiment thereof.

Referring to FIGURE 1A, reference numeral 10 designates generally an area, perhaps associated with a manufacturing process, whose temperature is to be controlled by the energization of a condition changing means in the form of an electrical heater 11. The temperature within area 10 is sensed by a temperature responsive impedance element 12 in the form of a thermistor.

Thermistor 12 is connected as a variable impedance leg of a bridge circuit which is identified generally by means of reference numeral 13. The output terminal of this bridge circuit exist at terminals 14 and 15, the bridge receiving its energizing voltage from a steady state source of D.C. voltage having a positive terminal 16 and a negative terminal 17.

The output of bridge circuit 13, that is terminals 14 and 15, is connected to two inputs respectively of a first differential amplifier identified generally by means of reference numeral 18. This differential amplifier includes first and second transistors 19 and 20. Base electrode 220 and emitter electrode 21 constitute the input electrodes of transistor 19, whereas base electrode 22 and emitter electrode 23 constitute the input electrodes of transistor 20. The base electrodes 220 and 22 are connected through resistors 24 and 25 respectively to the bridge output terminals 14 and 15. The emitter electrodes 21 and 23 are connected through a common impedance element, identified generally by means of reference numeral 26, to a terminal 27. Thus, the input to transistor 19 can be considered to exist between terminals 14 and 27 whereas the input to transistor 20 can can be considered to exist between terminals 15 and 27.

The potential level of terminals 15 and 27 are reference potential levels whereas the potential level of terminal 14 is variable with the impedance magnitude of thermistor 12.

Considering now the individual legs of the bridge, a first leg can be considered to be a resistor 28 connected between output terminal 15 and a terminal 29. A second leg of the bridge includes resistor 30 which is connected between terminal 15 and a terminal 31. The third leg of the bridge includes a resistor 32 connected in series with a set point potentiometer 33, the series connected elements 32 and 33 being connected between terminals 31 and 14. The fourth and final leg of the bridge includes the series connected thermistor 12, the base-to-emitter circuit of a transistor 34, and a low magnitude resistor 35. Transistor 34 provides a fail safe feature for thermistor "open" protection whereas resistor 35, of a magnitude of approximately one ohm, provides line voltage compensation such that an increase in line voltage does not result in an appreciable increase in energization of heater 11.

Turning again to the first differential amplifier, 18, a first output of this differential amplifier exists at impedance 36 and series connected potentiometer 37, connected to the collector electrode 38 of transistor 20. The voltage developed across resistor 36 and the lower portion of potentiometer 37 is applied to the input electrodes (base 39 and emitter 40) of a transistor 41 whose output, including collector electrode 42, is connected to shunt capacitor 43 and thus to control the state of charge of this capacitor.

The second output of differential amplifier 18 exists at the collector electrode 44 of transistor 19 and is connected through a resistor 45 to control the state of charge of a capacitor 46, which capacitor is shunted by a diode 47.

The network including transistor 41, and the manner in which capacitors 46 and 43 are charged to control the time of firing of a unijunction transistor 48, can be considered to be a linearity control which functions to provide a linear power output to heater 11 within a wide range of variation in required energization of the heater.

Capacitors 43 and 46 are connected in polarity adding relationship to the input electrodes of a unijunction transistor 48. The time required to charge these capacitors is variable with the degree of energization of heater 11 which is required, and controls the time of firing of unijunction transistor 48. The time of firing of unijunction 48, to produce a pulse of current through the primary winding 49 of a transformer 50, is effective to control the time of firing of the silicon controlled rectifiers 51 and 52 respectively.

Silicon controlled rectifiers 51 and 52 are connected in circuit with the A.C. power line conductor 53 and 54 to control the degree of energization of heater 11. Specifically, power line conductor 54 is connected directly to one side of the heater 11 by means of a conductor 55 whereas power line conductor 53 is connected through a fuze 56 and a conductor 57 to the anode of SCR 51 and to the cathode of SCR 52. The cathode of SCR 51 and the anode of SCR 52 are connected to conductor 58 and then to the other terminal of heater 11. Thus, it can be seen that the time of firing of the respective SCR 51 and 52, as related to respective half cycles of the A.C. source 53–54, is controlled by secondary windings 59 and 60 of transformer 50 and controls the degree of energization of heater 11.

Unijunction 48, connected to control the time of firing of SCR 51 and SCR 52 is itself connected to receive energization from the D.C. source of voltage whose positive and negative output terminals exist at terminals 16 and 17 respectively. The base 61 of unijunction 48 is connected to terminal 17 through the primary winding 49 of transformer 50 whereas the base 62 is connected to terminal 16 through resistor 63, the collector-to-emitter circuit of transistor 64, the emitter-to-collector circuit of transistor 65, and low magnitude resistor 67 to terminal 16. In this particular circuit, resistor 67 is a low value impedance in relation to the impedance value of resistors 68 and 69. For example, resistor 67 may be in the magnitude range of 20 ohms, whereas resistors 68 and 69 are in the magnitude range of 15,000 to 20,000 ohms. Furthermore, in this above traced circuit, the state of conduction of transistor 65 is controlled by the state of conduction of transistor 34 and, in the event of open circuiting of the circuit including thermistor 12, transistors 34 and 65 are both rendered non-conductive. Furthermore, transistor 64 is connected to a source of pulsating D.C. voltage which exists between terminals 16 and 70. For this voltage source, terminal 16 is positive and terminal 70 is negative. Transistor 64 is maintained conductive for a major portion of each half cycle of the A.C. source by means of a circuit which can be traced from terminal 16 through resistor 67, the collector-to-emitter circuit of transistor 65, the emitter-to-base circuit of transistor 64, and resistor 68 to terminal 70. Once every one-half cycle of the alternating source of voltage to which power line conductors 53 and 54 are connected transistor 64 is rendered momentarily nonconductive as the pulsating D.C. voltage approaches and drops to zero.

When transistor 64 is rendered nonconductive the base electrodes 61 and 62 of unijunction 48 are disconnected from D.C. source 16–17 and capacitors 43 and 46 now discharge through the emitter-base circuit of unijunction 48. In this manner, the periodic firing of unijunction 48 is synchronized to the A.C. supply voltage, the A.C. supply voltage being in turn connected to the SCR's 51 and 52. Thus, a controlled charging of capacitors 43 and 46, as controlled in a unique manner by the linearity control above mentioned and by differential amplifier 18, is effective to cause unijunction 48 to fire at a particular point in each half cycle of the A.C. supply voltage to thus cause a corresponding one of the SCR's 51 and 52 to fire and thus variably control the degree of energization of heater 11.

The apparatus thus far described, which has dealt with the structure disclosed in FIGURE 1A, is essentially a temperature control device having bridge circuit 13, with thermistor 12 as a sensing element. Differential amplifier 18 senses the bridge unbalance and controls the degree of energization of heater 11. In one manner of construction of my invention the bridge is balanced and transistors 19 and 20 conduct substantially an equal amount to cause SCR's 51 and 52 to fire at approximately the 90° point on each of the half cycles of the A.C. source of voltage. This provides 50% of full load power to heater 11.

When the resistance of thermistor 12 increases, corresponding to a temperature drop at area 10, transistor 19 conducts more current and thus charges capacitor 46 in a shorter period of time, to thereby advance the firing angle of the SCR's and thus increasing the degree of energization of heater 11.

When the conditions existing at area 10 require 50% or less of the full power available to energize heater 11, then transistor 20 conducts to maintain transistor 41 conductive, shorting out capacitor 43. Thus, the only timing capacitor in the linearity circuit which is effective to control the time of firing of unijunction 48 is capacitor 46, which in turn is charged at a time rate determined by conduction of transistor 19. Thus, for a state of energization of heater 11 which is 50% of the full power available, or less than 50% of this power, the firing of unijunction 48 is controlled by the state of conduction of transistor 19 which charges capacitor 46 to the firing voltage of unijunction 48. This charging of capacitor 46 takes place over longer time periods, thus retarding the firing angle of SCR's 51 and 52, as the power demand is reduced.

As more power is required for heater 11, transistor 19 conducts more heavily and transistor 20 conducts to a lesser degree. The reduced conduction of transistor 20 is effective to also reduce the conduction of transistor 41. At 100% of full load, transistor 41 is completely nonconductive and thus capacitor 43 is "inserted" into the timing circuit in series with capacitor 46. The extent of "insertion" between 50% and 100% of full load is controlled by the state of conduction of transistor 41 as controlled by one of the outputs of differential amplifier 18.

Capacitor 43 is connected to the source of voltage, 16–17 by means of a voltage divider including resistors 80 and 81. As has been mentioned, transistor 64 is momentarily rendered non-conductive by virtue of its connection to the pulsating source of D.C. voltage at terminals 16 and 70. Voltage divider 80–81 is connected to this source of voltage 16 and 70 through the transistor 64 and thus as transistor 64 is first rendered conductive, capacitor 43 is immediately charged, as controlled by the state of conduction of transistor 41.

Capacitor 43, when charged, provides a pedestal voltage which adds to the voltage of capacitor 46 and requires less charging of capacitor 46 to reach the firing voltage of unijunction transistor 48. In this manner, my unique linearity control, controlled by the second output of differential amplifier 18 existing at the output of transistor 20 is effective to modify the control of unijunction transistor 48 as the load power demand increases. As transistor 64 is periodically rendered momentarily nonconductive, capacitors 43 and 46, which are now charged, discharge through the emitter-to-base circuit of unijunction 48 and thus every half cycle of the A.C. source of voltage, the timing function is repeated to variably control the firing angle of the SCR's 51 and 52, as required by changes in the load power demand.

Referring specifically to the SCR circuit, the secondary windings 59 and 60 of transformer 50 are connected to the respective SCR's 52 and 51 and the voltage produced in the secondary windings by firing of unijunction transistor 48 is effective to render one or the other of these SCR's conductive, depending upon the polarity of the A.C. supply lines 53 and 54 at this time. A diode circuit 82 provides transient suppression to protect SCR's 51 and 52.

As has been mentioned transistor 34 and associated circuit components provide fail safe protection for thermistor "open" protection. As the thermistor resistance increases, the tendency of the apparatus is to provide more electrical power to heater 11. Thus, if the thermistor circuit should open full power would be applied to the load and over-heating would result. In the circuit construction which I provide, the thermistor current flows through the emitter-to-base circuit of transistor 34, maintaining this transistor conductive and providing forward bias current for transistor 65. This forward bias current circuit can be traced from positive terminal 16 through resistor 67, the emitter-to-collector circuit of transistor 34, and the base-to-emitter circuit of transistor 65 to terminal 17. Thus conduction of transistor 65 is dependent upon conduction of transistor 34 and this in turn is dependent upon circuit continuity to thermistor 12. A failure, causing nonconduction of transistor 64 and/or 65, is now effective to disconnect unijunction 48 from its voltage source 16–17 to thus prevent firing of SCR's 51 and 52, resulitng in complete deenergization of heater 11.

A resistor 85, shunted by a thermistor 86, is provided to insure that transistor 34 will become nonconductive when an open circuit occurs at the same time that a high ambient temperature exists at transistor 34. At such high ambients, the leakage current of this transistor is unduly high and control of the transistor may become erratic.

Turning now to the structure disclosed in FIGURE 1B, and to the manner in which the structure cooperates in a unique manner with the device of FIGURE 1A, it can be seen that the output terminals 14 and 15 of bridge circuit 13 are connected to conductors 90 and 91 respectivley and that these conductors are in turn connected to control a second differential amplifier, identified generally by means of reference numeral 92. Differential amplifier 92 includes first and second transistors 93 and 94. The base electrodes of transistors 93 and 94 are connected through resistors 95 and 96 respectively to conductors 90 and 91 and thereby to bridge output terminals 14 and 15. The emitter electrodes of these transistors are connected through a common impedance element 97 to a conductor 98 which is in turn connected to terminal 99 of FIGURE 1A. Terminal 99 is a positive terminal connected to positive terminal 16 through resistors 35 and 67. A zener diode 100 is connected from terminal 99 to terminal 17 to stabilize the voltage therebetween. Terminal 17 is connected to a conductor 101 which is continued in FIGURE 1B and is connected through load impedances 102 and 103 respectively to the output or collector electrodes of transistors 93 and 94.

Differential amplifier 92 is constructed and arranged to sense the state of unbalance of bridge circuit 13, above or below the balance condition of the bridge. Reference numeral 104 (FIGURE 1B), identifies generally an indication circuit which is electrically responsive to a unidirectional voltage or current. Circuit 104 includes an input at terminals 105 and 106. These input terminals are connected through a diode circuit 107 including diodes which are so pooled as to make the indication circuit 104 responsive to the voltage which exists between a variable potential potentiometer wiper 108 at load impednace 103 and a negative potential point 109 at load impedance 102. This circuit configuration 104 and 107 is effective to sense a given degree of unbalance of bridge 13 corresponding to a high temperature condition.

A further circuit connection is provided to be responsive to a voltage existing between a variable positive potential potentiometer wiper 110 at load impedance 102 and a negative potential point 111 at load impedance 103. This further circuit configuration 104 and 107 is effective to respond to a given departure from bridge balance corresponding to a low temperature condition.

Potentiometer wipers 108 and 110 are selectively variable to independently control the departure from a given temperature, above the given temperature and below the given temperature, which will be indicated by indicating circuit 104.

Indicating circuit 104 includes transistors 120 and 121 which are connected to control the firing of a silicon controlled rectifier 122, and thus control the energization of an indicating light 123. Once SCR 122 has fired, it is maintained in a fired condition and indicating light 103 is maintained continuously energized to indicate that a given departure has occurred, even though the condition of balance or unbalance of the bridge may be subsequently restored.

Such an operation, to provide "memory" by means of maintaining indicator light 123 continuously energized, may be desirable where heater 11 provides electrical heat energy for manufacturing processes in which it is necessary to provide indication when the apparatus has not provided the degree of temperature control which may be desired throughout the entire process.

Referring to the specific operation of circuit 104, transistor 120 is normally conductive whereas transistor 121 is normally nonconductive. So long as this condition exists, silicon controlled rectifier 122 remains nonconductive. Upon the condition of bridge 13 (FIGURE 1A) departing from a condition as determined by the setting of potentiometer 108 or by the setting of potentiometer 110, transistor 120 is rendered nonconductive and transistor 121 is rendered conductive to provide a firing voltage to charge capacitor 130. When SCR 122 fires, light 123 is energized. SCR 122 is maintained conductive by a capacitor 131 which is charged from the source of supply voltage for transistors 120 and 121. Firing of SCR 122 lowers the supply voltage of transistors 120 and 121 to a very low value, to render the transistors inoperative. The charge of capacitor 131 maintains current flow through SCR 122, to hold the SCR conductive once it has been rendered conductive. If it is desired to eliminate the memory function of circuit 104, then capacitor 131 is eliminated and indicator light 123 is energized only so long as the given departure of bridge 13, as selected by potentiometers 108 and 110, actually exists.

A reset switch 132 is provided to reset the memory portion of circuit 104 to interrupt conduction of SCR 122 and to allow indicator light 123 to be deenergized.

From the above description, it can be seen that I have provided a unique condition responsive apparatus in which a thermistor controlled bridge circuit controls a first and a second differential amplifier to control, in a unique manner, the degree of energization of an electrical load and to also indicate a predetermined departure from a given control condition, either above or below a given condition. Other modifications of my invention will be apparent to those skilled in the art and thus it is intended that my invention be limited solely to the scope of the appended claims.

I claim as my invention:
1. Condition responsive apparatus comprising;
   a bridge circuit having a condition sensing element and an output which is variable with the condition of bridge balance as controlled by said condition sensing element,
   a differential amplifier connected to be controlled by said bridge output and to have a pair of inversely related amplifier outputs dependent upon the condition of bridge unbalance,
   first means controlled by one of said amplifier outputs to provide an output proportional to bridge unbalance within a first range of bridge unbalance,
   and second means controlled by the other of said amplifier outputs and connected to control said first means to modify the output thereof when the bridge unbalance is within a second range of bridge unbalance.

2. Control apparatus, comprising;
condition sensing means having a condition sensor, said condition sensing means having a pair of outputs which vary inversely with variations in the condition to which the said condition sensor is subjected,
a unijunction transistor having a pair of input electrodes and having a pair of output electrodes connected to a source of periodically interrupted D.C. voltage,
first circuit means connecting one of said outputs to the input electrodes of said unijunction transistor to control the time of firing of said unijunction transistor as a function of the condition to which said condition sensor is subjected,
and second circuit means controlled by the other of said outputs and connected to the input electrodes of said unijunction transistor to modify the control thereof by said first circuit means as a function of the condition to which said condition sensor is subjected only upon a given condition being sensed.

3. In combination;
a unijunction transistor having output electrodes and input electrodes,
means adapted to connect said output electrodes to a source of periodically interrupted D.C. voltage,
first and second series connected capacitors connected to said input electrodes,
first means to charge said first capacitor at a rate dependent upon the magnitude of an electrical condition,
and second means to maintain said second capacitor short circuited when the magnitude of the electrical condition is below a given level and to charge said second capacitor when the magnitude of the electrical condition is above said given level, said first and second means being effective to control the time of conduction of said unijunction transistor as a function of the magnitude of said electrical condition.

4. In combination:
a unijunction transistor having output electrodes and input electrodes,
means adapted to connect said output electrodes to a source of D.C. voltage,
first and second series connected capacitors connected to said input electrodes,
first means to charge said first capacitor at a rate dependent upon the magnitude of an electrical condition,
second means to maintain said second capacitor short circuited when the magnitude of the electrical condition is below a given level and to charge said second capacitor when the magnitude of the electrical condition is above said given level, said first and second means being effective to control the time of conduction of said unijunction transistor as a function of the magnitude of said electrical condition,
and synchronization means effective to periodically interrupt said source of D.C. voltage to thus periodically discharge said first and second capacitor.

5. Control apparatus, comprising;
condition responsive means including a condition sensor adapted to be subjected to a condition and having a pair of outputs which vary inversely with variations in the condition,
a unijunction transistor having input electrodes and having output electrodes connected to a source of D.C. voltage,
first and second series connected capacitors connected to shunt said unijunction input electrodes,
first circuit means connecting said first capacitor to one of said condition responsive means outputs to charge said first capacitor at a time rate which increases as said one output increases,
a transistor having output electrodes connected to shunt said second capacitor and having input electrodes connected to be controlled by the other of said condition responsive means outputs in a manner to reduce the shunting of said second capacitor as the magnitude of said other output decreases,
means connecting said second capacitor to said source of D.C. voltage and effective to charge said second capacitor to a voltage which is controlled by the shunting effect of said transistor,
and synchronizing means to periodically interrupt said source of D.C. voltage and to periodically discharge said first and second capacitors at a given time reference point.

6. Control apparatus, comprising;
a bridge circuit including a condition sensor adapted to be subjected to a condition, the output of said bridge circuit being variable with variation in the condition,
a differential amplifier having an input connected to be controlled by said bridge output and having a pair of amplifier outputs which vary inversely,
a unijunction transistor having input electrodes and having output electrodes connected to a source of D.C. voltage through load means,
first and second series connected capacitors connected to shunt said unijunction input electrodes,
a transistor having output electrodes connected to shunt one of said capacitors and having input electrodes connected to be controlled by one of said amplifier outputs, said transistor being effective to reduce the shunting of said one capacitor as a greater degree of energization of said load means is required,
means including the other of said amplifier outputs connected to charge the other of said capacitors to control the time of conduction of said unijunction transistor and thus the degree of energization of said load means,
means adapted to charge said one capacitor from said source of D.C. voltage to further control the time of conduction of said unijunction transistor,
and synchronizing means to periodically interrupt said source of D.C. voltage and effective to periodically discharge said capacitor.

7. Control apparatus for use in controlling the condition of an area having electrically operable condition changing means therefor, comprising;
condition sensing means connected to control a differential amplifier having a first and a second output which vary inversely in magnitude as the condition departs from a given state,
an A.C. source of voltage, rectifier means connected thereto to provide a pulsating source of D.C. voltage,
a first transistor having output electrodes and having input electrodes connected to said D.C. source to render said first transistor conductive during each half cycle of said A.C. source and to render said first transistor momentarily nonconductive at the end of each half cycle of said A.C. source,
a unijunction transistor having input electrodes and having output electrodes connected in circuit with the condition changing means and in circuit with said first transistor output electrodes to a second source of D.C. voltage to thereby energize the condition changing means as determined by the time of firing of said unijunction transistor,
a first capacitor connected to said second source of D.C. voltage,
a second transistor having input electrodes connected to be energized by the second output of said differential amplifier to render said second transistor conductive when a low degree of energization of the condition changing means is required, said second transistor having output electrodes connected to shunt said first capacitor and thereby being effective to control the charge of said first capacitor to increase the charge thereof as higher degrees of energization of the condition changing means is required, a second capacitor connected in circuit with the first output of said differential amplifier and in circuit with said first capacitor, to charge said second capacitor from said first output at an increasing rate as higher degrees of energization of the condition changing means is required, and means connecting said first and second capacitors to said unijunction input electrodes to control the time of firing thereof in accordance with the charge on said capacitors, to thereby control the degree of energization of the condition changing means.

8. Control apparatus for use in controlling the condition of an area having electrically operable condition changing means therefor, comprising;

condition sensing means connected to control a differential amplifier having a first and a second output which vary inversely in magnitude as the condition departs from a given state, an A.C. source of voltage, rectifier means connected thereto to provide a source of pulsating D.C. voltage, a first transistor having output electrodes and having input electrodes connected to said D.C. source in a manner to render said first transistor conductive during each half cycle of said A.C. source and to render said first transistor momentarily nonconductive at the end of each half cycle of said A.C. source, a second transistor having output electrodes and having input electrodes connected in circuit with said condition sensing means to render said second transistor conductive so long as said condition sensor is operative, a unijunction transistor having input electrodes and having output electrodes connected in circuit with the condition changing means and in circuit with said first and second transistor output electrodes to a second source of D.C. voltage to thereby energize the condition changing means as determined by the time of firing of said unijunction transistor, a first capacitor connected to said second source of D.C. voltage, a third transistor having input electrodes connected to be energized by the second output of said amplifier to render said third transistor conductive when a high degree of energization of the condition changing means is not required, said third transistor having output electrodes connected to shunt said first capacitor and being effective to control the charge of said first capacitor to increase the charge as higher degrees of energization of the condition changing means are required, a second capacitor connected in circuit with the first output of said amplifier and in circuit with said first capacitor, the charge on said second capacitor increasing as higher degrees of energization of the condition changing means are required, and means connecting said first and second capacitors to said unijunction input electrodes to control the time of firing thereof in accordance with the charge on said capacitors to thereby control the degree of energization of the condition changing means.

9. Control apparatus, comprising;

condition sensing means adapted to be subjected to a condition to be controlled, bridge circuit means including said condition sensing means and including set point control means to select the magnitude of the condition to be controlled, said bridge circuit means having an output which is indicative of bridge unbalance and of the magnitude of the condition sensed by said condition sensing means, a first and second differential amplifier, each of which has input means connected to said bridge circuit means output, and each of which has a first and a second output which varies inversely with bridge unbalance, condition changing means, control circuit means connected to control said condition changing means and constructed and arranged to be controlled by the first output of said first amplifier within a first range of bridge unbalance and by the first and the second outputs of said first amplifier within a second range of bridge unbalance to provide control of said condition changing means which is proportional to bridge unbalance, indication circuit means including an output indicative of a given departure of the condition from the selected magnitude and constructed and arranged to be controlled by the first and second outputs of said second amplifier to provide indication of said given departure above or below the selected magnitude.

10. Control apparatus, comprising:

a source of D.C. voltage having a pair of voltage terminals, a bridge circuit having first and second impedance elements series connected across said voltage terminals to form a first bridge output terminal at the junction of said first and second impedance elements, and having a third impedance element and a condition responsive impedance element series connected across said voltage terminals to form a second bridge output terminal at the junction of said third impedance element and said condition responsive impedance element, a differential amplifier having a pair of transistors each having a pair of input terminals and a pair of output terminals, circuit means connecting an input terminal of each of said transistors to said first and second bridge output terminals respectively, circuit means connecting the other of the input terminals of each of said transistors through a common impedance element to one of said voltage terminals to thus cause the output current of said transistors to vary inversely with changes in impedance of said condition responsive impedance element, a first and a second load impedance, each of which is connected in circuit with the respective output electrodes of said transistors, electrically responsive indication means having an output indicative of a given departure from a condition of balance of said bridge circuit, and circuit means including diode means connecting said voltage responsive means to said first and second load impedances in a manner to respond to a given voltage established from a low potential point of one of said load impedances to a high potential point of the other of said load impedances.

11. In combination:

a pair of transistors each having input electrodes and output electrodes, circuit means connected to one of the input electrodes of each of said transistors to apply a reference voltage through a common impedance element to said one input electrode of each of said transistors, circuit means connected to the other input electrode of one of said transistors to apply a reference voltage thereto, circuit means connected to the other input electrode of the other of said transistors to apply a variable condition responsive voltage thereto, which condition responsive voltage may vary above and below a given value, a first and a second load impedance, circuit means connecting each of said load impedances in circuit with the output electrodes of one of said transistors,
electrical responsive means responsive only to unidirectional current flow of a given magnitude,
and circuit means connecting said electrical responsive means to a high potential point on each of said load impedances and to a low potential point on each of said load impedances such that said unidirectional current flows when said condition responsive voltage varies above or below said given value.

12. In combination:
a unijunction transistor having output electrodes and input electrodes,
means adapted to connect said output electrodes to a source of periodically interrupted D.C. voltage,
capacitor means connected to said input electrodes,
condition sensing means having a pair of outputs which vary inversely with variations in a condition being sensed,
first circuit means connecting one of said outputs to the input electrodes of said unijunction to control the rate of charging of said capacitor means and thus the time of firing of said unijunction transistor as a function of the condition being sensed,
and second circuit means controlled by the other of said outputs and responsive to a given variation in the condition being sensed and connected to modify the rate of charging of said capacitor means upon the occurrence of said given variation.

13. In combination:
a unijunction transistor having output electrodes and input electrodes,
means adapted to connect said output electrodes to a source of periodically interrupted D.C. voltage,
capacitor means connected to said input electrodes,
condition sensing means including a differential amplifier having an input connected to be controlled by a condition sensor and having a pair of amplifier outputs which vary inversely,
first circuit means connecting one of said amplifier outputs to the input electrodes of said unijunction to control the rate of charging of said capacitor means and thus the time of firing of said unijunction transistor as a function of the condition being sensed,
and second circuit means controlled by the other of said amplifier outputs and responsive to a given variation in the condition being sensed and connected to modify the rate of charging of said capacitor means upon the occurrence of said given variation.

14. In combination:
an A.C. source of voltage, rectifier means connected thereto to provide a source of pulsating D.C. voltage,
a synchronizing transistor having output electrodes and having input electrodes connected to said source of pulsating D.C. voltage in a manner to render said synchronizing transistor conductive during each half cycle of said A.C. source and to render said synchronizing transistor momentarily nonconductive at the end of each half cycle of said A.C. source,
a unijunction transistor having input electrodes and having output electrodes connected in circuit with output means and in circuit with said synchronizing transistor output electrodes to a source of steady-state D.C. voltage,
and control means connected to the input electrodes of said unijunction transistor to control the conduction thereof, said synchronizing transistor functioning to synchronize the conduction of said unijunction transistor to said A.C. source.

No references cited.

ARTHUR GAUSS, *Primary Examiner.*
R. H. EPSTEIN, *Assistant Examiner.*